United States Patent
Pannala et al.

(10) Patent No.: US 12,145,144 B2
(45) Date of Patent: Nov. 19, 2024

(54) THREE-DIMENSIONAL ANNULAR ROTATING FLUIDIZED BED FLUID-SOLIDS CONTACTOR

(71) Applicant: SABIC Global Technologies B.V., Bergen op Zoom (NL)

(72) Inventors: Sreekanth Pannala, Sugar Land, TX (US); Christoph Dittrich, Geleen (NL); David West, Sugar Land, TX (US); Tingwen Li, Sugar Land, TX (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 17/310,585

(22) PCT Filed: Feb. 13, 2020

(86) PCT No.: PCT/IB2020/051202
§ 371 (c)(1),
(2) Date: Aug. 12, 2021

(87) PCT Pub. No.: WO2020/165832
PCT Pub. Date: Aug. 20, 2020

(65) Prior Publication Data
US 2022/0134300 A1 May 5, 2022

Related U.S. Application Data

(60) Provisional application No. 62/805,213, filed on Feb. 13, 2019.

(51) Int. Cl.
*B01J 8/38* (2006.01)
*B01J 8/00* (2006.01)
(Continued)

(52) U.S. Cl.
CPC ............. *B01J 8/382* (2013.01); *B01J 8/0015* (2013.01); *B01J 8/006* (2013.01); *B01J 8/222* (2013.01); *B01J 8/386* (2013.01); *C10G 11/18* (2013.01)

(58) Field of Classification Search
CPC . B01J 8/1881; B01J 8/1872; B01J 8/10; B01J 8/14; B01J 8/38; B01J 8/382; B01J 8/384; B01J 8/386
See application file for complete search history.

(56) References Cited

U.S. PATENT DOCUMENTS 3,276,627 A * 10/1966 Birkestrand ............... F26B 3/08
222/1
3,768,172 A * 10/1973 Klein ..................... F26B 17/107
34/594
(Continued)

FOREIGN PATENT DOCUMENTS

| CN | 1597731 | 3/2005 |
|---|---|---|
| CN | 102836676 | 12/2014 |

(Continued)

OTHER PUBLICATIONS

Machine Translation of WO-2009050288 (Year: 2009).*
(Continued)

*Primary Examiner* — Lessanework Seifu
(74) *Attorney, Agent, or Firm* — Norton Rose Fulbright US LLP

(57) ABSTRACT

A fluid-solids contactor comprising an annular rotating fluidized bed and a method of using the same are disclosed. The fluid-solids contactor includes a vessel and a plurality feed inlets disposed thereon. The vessel comprises a stationary inner wall, an outer wall, and a chamber formed between the stationary inner wall and the outer wall. The feed inlets are configured to create an annular rotating bed with mixture of solids and a fluid when the solid particles (Continued)

and a fluid are fed into the chamber. The stationary inner wall of the vessel is permeable to the fluid such that the fluid from the chamber can be continuously withdrawn from the solids to the space within the stationary inner wall of the vessel.

20 Claims, 3 Drawing Sheets

(51) Int. Cl.
  *B01J 8/22* (2006.01)
  *C10G 11/18* (2006.01)

(56) References Cited

U.S. PATENT DOCUMENTS

| | | | |
|---|---|---|---|
| 4,454,661 | A | 6/1984 | Klein et al. |
| 5,681,450 | A | 10/1997 | Chitnis et al. |
| 8,071,034 | B2 | 12/2011 | de Broqueville et al. |
| 8,257,657 | B2 | 9/2012 | de Broqueville et al. |
| 8,733,400 | B2 | 5/2014 | Muggli et al. |
| 9,751,064 | B2 | 9/2017 | De Wilde et al. |
| 2007/0238839 | A1 | 10/2007 | de Broqueville et al. |
| 2008/0269432 | A1 | 10/2008 | de Broqueville et al. |
| 2009/0022632 | A1 | 1/2009 | de Broqueville |
| 2009/0311092 | A1 | 12/2009 | de Broqueville et al. |
| 2010/0197879 | A1 | 8/2010 | Broqueville et al. |
| 2013/0145732 | A1 | 6/2013 | Gwynn et al. |

FOREIGN PATENT DOCUMENTS

| | | | |
|---|---|---|---|
| EP | 0551643 | 5/1997 | |
| EP | 1847314 | 10/2007 | |
| EP | 2596859 | 5/2013 | |
| EP | 2849878 | 7/2016 | |
| GB | 986842 | 3/1965 | |
| JP | H06106041 | 4/1994 | |
| WO | WO 9829181 | 7/1998 | |
| WO | WO-2009050288 A1 * | 4/2009 | ............ B01J 8/1818 |
| WO | WO 2015102480 | 7/2015 | |
| WO | WO 2017031556 | 3/2017 | |
| WO | WO 2017178551 | 10/2017 | |

OTHER PUBLICATIONS

International Search Report and Written Opinion issued in Corresponding PCT Application No. PCT/IB2020/051202, dated May 22, 2020.

Office Action issued in corresponding Chinese Application No. 202080023622, dated Apr. 22, 2023.

Office Action issued in corresponding Chinese Application No. 202080023622, dated Jan. 10, 2024.

* cited by examiner

THREE-DIMENSIONAL ANNULAR ROTATING FLUIDIZED BED FLUID-SOLIDS CONTACTOR

CROSS REFERENCE TO RELATED APPLICATIONS

This application is a national phase application under 35 U.S.C. § 371 of International Application No. PCT/IB2020/051202 filed Feb. 13, 2020, which claims the benefit of priority of U.S. Provisional Patent Application No. 62/805,213 filed Feb. 13, 2019, all of which are hereby incorporated by reference in their entirety.

FIELD OF INVENTION

The present invention generally relates to a fluid-solids contactor and the uses thereof. More specifically, the present invention relates to a fluid-solids contactor that comprises a rotating fluidized bed with large centrifugal forces.

BACKGROUND OF THE INVENTION

Fluidized beds are used in many chemical production processes, including catalytic and non-catalytic conversion of petrochemical feedstocks, drying, coating, gas-phase polymerization, solids separation, solid-fluid separation, fluidized bed combustion, interface modification, and solid degassing. Generally, a fluidized bed includes a solid-fluid mixture that exhibits fluid-like properties. When it is in operation, the fluidized bed can be considered as a bulk with a single density. Compared to fixed beds, packed beds, or moving beds, fluidized beds are capable of increasing the contact of the fluid and the solid particles in the beds, continuous regeneration of the solids, and improving heat transfer throughout the fluidized beds.

However, fluidized beds suffer several problems in industrial applications. Firstly, because of the gas velocity in conventional fluidized beds cannot be increased ad libitum, the residence time of the feed gas cannot be decreased below a limiting value dictated by hydrodynamics. Thus, it is extremely challenging to use these fluidized bed reactors for reactions that require very short residence times. Furthermore, there is no independent control over the gas and solids residence time because of solids recirculation, gas back-mixing, etc. Moreover, the effluent released from the fluid-solids contactors and/or reactors that contain fluidized beds often contain a fluid-solids mixture. Thus, additional separation process is required to recover the product, which can increase the capital expenditure for a fluidized bed, and its operating costs.

Overall, while the technologies of utilizing fluidized bed in chemical production processes exist, the need for improvements in this field persists in light of at least the aforementioned drawbacks for fluidized bed technologies.

BRIEF SUMMARY OF THE INVENTION

A solution to at least some of the above-mentioned problems associated with the application of fluidized beds has been discovered. The solution resides in a fluid-solids contactor that contains a fluid-driven rotating annular fluidized bed. The fluid-solids contactor includes an annular vessel that is adapted to rotate the solid particles by injecting gas via a plurality of gas inlets. The fluidized bed particles move in a spiral trajectory in a chamber formed between a stationary inner wall and an outer wall of the vessel while the fluid moves from the injectors on the outer wall to the stationary inner wall and subsequently exits through space within the stationary inner wall. Hence, the fluid-solids contractor is capable of limiting the back mixing of the fluid and solids and enabling independent control of the gas and solids residence time distribution. Additionally, the fluid-solids contactor can be operated to significantly increase the slip velocity between the fluid and the solid particles. Thus, it is capable of achieving short residence time for the fluid in the fluid-solids contactor. Furthermore, the fluid-solids contactor is capable of separating the fluid from the solid particles in the fluidized bed by centrifugal force, thereby reducing the operating and expenditure costs for separating the fluid and the solid of the fluidized bed outside of the fluid-solids contactor. Moreover, the fluid-solids contactor can integrate functions of multiple units in one vessel. For instance, the fluid-solids contactor can be divided into multiple zones. A first zone can be used for a gas phase reaction in the presence of a solid catalyst and a second zone can be used for regenerating the spent catalyst using a regenerating gas, further reducing the operational costs and the capital expenditure compared to conducting these different processes in different units in a conventional system with solids conveying between the systems. Therefore, the method of the present invention provides a technical solution to at least some of the problems associated with the currently available fluidized-bed based fluid-solids contactors.

Embodiments of the invention include a fluid-solids contactor adapted to form a fluidized bed. The fluid-solids contactor comprises a vessel comprising an outer wall and a stationary inner wall, which forms a chamber between the walls. The fluid-solids contactor comprises a solids inlet, at a first end of the vessel, adapted to receive solid particles into the chamber. The fluid-solids contactor comprises one or more feed inlets adapted to inject a fluid into the chamber in a direction such that as the fluid flows in the chamber, solid particles rotate around between the outer wall and the stationary inner wall. The stationary inner wall of the vessel is adapted to stabilize the rotating solid particles, and continuously withdraw the fluid radially into space confined by the stationary inner wall.

Embodiments of the invention include a method of processing materials. The method comprises providing a fluid-solids contactor. The fluid-solids contactor comprises a vessel comprising an outer wall and a stationary inner wall, which form a chamber between the walls. The fluid-solids contactor comprises a solids inlet, at a first end of the vessel, adapted to receive solid particles into the chamber. The fluid-solids contactor comprises one or more feed inlets adapted to inject a fluid into the chamber in a direction such that as the fluid flows into the chamber, solid particles rotate around between the outer wall and the stationary inner wall. The stationary inner wall of the vessel is permeable to the fluid and adapted to stabilize the rotating solid particles, and continuously withdraw the fluid radially into space confined by the stationary inner wall. The method further comprises operating the fluid-solids contactor so that it has at least two zones with different functions. Each zone comprises one or more of the fluid inlets. The method further comprises feeding a fluid into each zone of the fluid-solids contactor through the one or more feed inlets of each zone. The method further comprises feeding solid particles into the fluid-solids contactor at the solids inlet at a first end of the vessel such that the fluid in each zone and the solid particles form a rotating dense solids bed. The method further still comprises within each zone of the fluid-solids contactor, contacting the fluid with the solid particles under process conditions sufficient to form a product. For the reactor with multiple zones for different functions, fluid-solids contactor can include an optional purge zone or plurality of zones adapted to purge the interstitial gas from solid particles therein with a purge gas.

Embodiments of the invention include a method of processing chemicals. The method comprises providing a fluid-solids contactor. The fluid-solids contactor comprises a vessel comprising an outer wall and a stationary inner wall, which form a chamber between the walls. The fluid-solids contactor comprises a solids inlet, at a first end of the vessel, adapted to receive solid particles into the chamber. The fluid-solids contactor comprises one or more feed inlets adapted to receive a fluid into the chamber in a direction such that as the fluid flows in the chamber, the fluid and the solid particles rotate in a spiral trajectory in the chamber of the vessel. The stationary inner wall of the vessel is permeable to the fluid and adapted to stabilize the rotating solid particles, and withdraw the fluid radially into space confined by the stationary inner wall. The method comprises operating the fluid-solids contactor so that it has one or more zones with different functions. Each zone comprises one or more of the feed inlets. The method further comprises feeding a fluid into each zone of the fluid-solids contactor through one or more feed inlets of each zone. The method further comprise feeding solid particles into the fluid-solids contactor at the solids inlet at a first end of the vessel such that the solid particles rotate in the chamber in a spiral trajectory. The method comprises within each zone of the annular rotating fluidized bed, contacting the fluid with the solid particles under operating conditions sufficient to process the fluid and/or the solid particles, and form a product stream.

The following includes definitions of various terms and phrases used throughout this specification.

The terms "about" or "approximately" are defined as being close to as understood by one of ordinary skill in the art. In one non-limiting embodiment the terms are defined to be within 10%, preferably, within 5%, more preferably, within 1%, and most preferably, within 0.5%.

The terms "wt. %", "vol. %" or "mol. %" refers to a weight, volume, or molar percentage of a component, respectively, based on the total weight, the total volume, or the total moles of material that includes the component. In a non-limiting example, 10 moles of component in 100 moles of the material is 10 mol. % of component.

The term "substantially" and its variations are defined to include ranges within 10%, within 5%, within 1%, or within 0.5.

The terms "inhibiting" or "reducing" or "preventing" or "avoiding" or any variation of these terms, when used in the claims and/or the specification, includes any measurable decrease or complete inhibition to achieve a desired result.

The term "effective," as that term is used in the specification and/or claims, means adequate to accomplish a desired, expected, or intended result.

The term "interstitial components," or "interstitial gas" as that term is used in the specification and/or claims, means a component(s) or gas between the intervening space between solid particles.

The use of the words "a" or "an" when used in conjunction with the term "comprising," "including," "containing," or "having" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The process of the present invention can "comprise," "consist essentially of," or "consist of" particular ingredients, components, compositions, etc., disclosed throughout the specification.

The term "primarily," as that term is used in the specification and/or claims, means greater than any of 50 wt. %, 50 mol. %, and 50 vol. %. For example, "primarily" may include 50.1 wt. % to 100 wt. % and all values and ranges there between, 50.1 mol. % to 100 mol. % and all values and ranges there between, or 50.1 vol. % to 100 vol. % and all values and ranges there between.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

For a more complete understanding, reference is now made to the following descriptions taken in conjunction with the accompanying drawings, in which.

DETAILED DESCRIPTION OF THE INVENTION

Currently, fluidized bed based fluid-solids contactors generally have broad residence time distribution for the fluid and/or solids therein. Additionally, the conventional fluid-solids contactor needs a separate instrument to separate the fluid product from the solid particles. Furthermore, a single conventional fluidized bed based fluid-solids contactor generally lacks capability to be used for multiple tasks simultaneously. The present invention provides a solution to at least some of these problems. The solution is premised on a fluid-solids contactor comprising an annular rotating fluidized bed in a chamber formed between a stationary inner wall and an outer wall of the contactor. The particles in the contactor flow primarily in a spiral trajectory, thereby minimizing back mixing of the solids (in tangential direction)

and/or fluid (in radial direction) and providing a great degree of independent control of the solids and/or fluid's residence time distributions. The stationary inner wall of the contactor is permeable to the fluid such that it enables fluid to pass through and enter the space confined by the stationary inner wall. The fluid-solids contactor is capable of separating solid particles and fluid in the fluidized bed by centrifugal force, thereby avoiding capital expenditure for an extra separation unit. Moreover, the fluid-solids contactor can be divided into different zones, which are used for different processes simultaneously. These and other non-limiting aspects of the present invention are discussed in further detail in the following sections.

A. Fluid-Solids Contactor with Three Dimensional Annual Rotating Fluidized Bed

Figure 1:
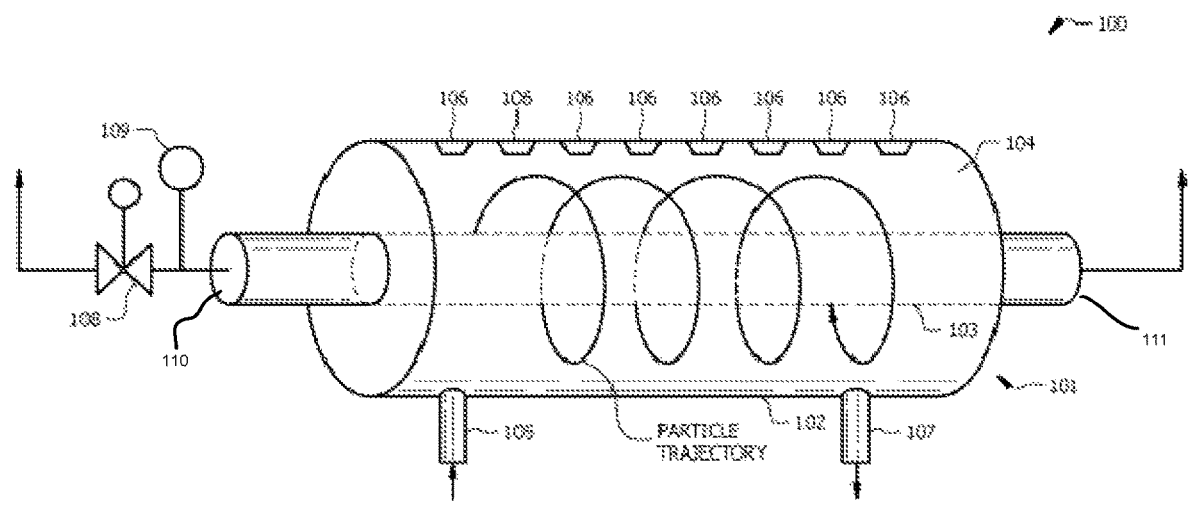
FIG. 1 shows a schematic diagram of a fluid-solids contactor, according to embodiments of the invention.

In embodiments of the invention, the fluid-solids contactor can include a vessel comprising a stationary inner wall, an outer wall, and a chamber formed there between. The fluid-solids contactor can comprise an annular rotating fluidized bed that includes a fluid that primarily flows radially inward and solid particles moving in a spiral trajectory. With reference to FIG. 1, a schematic diagram is shown of fluid-solids contactor 100 containing a three-dimensional annular rotating fluidized bed. According to embodiments of the invention, fluid-solids contactor 100 includes vessel 101 that comprises outer wall 102 and stationary inner wall 103.

In embodiments of the invention, stationary inner wall 103 has a plurality of openings that can be circular, square, rectangular, or other polyhedral shapes. The openings of stationary inner wall 103 may have an effective diameter (based on opening area) in a range of 1 mm to 10 mm and all ranges and values there between including ranges of 1 to 2 mm, 2 to 3 mm, 3 to 4 mm, 4 to 5 mm, 5 to 6 mm, 6 to 7 mm, 7 to 8 mm, 8 to 9 mm, and 9 to 10 mm. A ratio of the area of the openings to the overall area of stationary inner wall 103 can be in a range of 1 to 90% and all ranges and values there between including 1 to 5%, 5 to 10%, 10 to 15%, 15 to 20%, 20 to 25%, 25 to 30%, 30 to 35%, 35 to 40%, 40 to 45%, 45 to 50%, 50 to 55%, 55 to 60%, 60 to 65%, 65 to 70%, 70 to 75%, 75 to 80%, 80 to 85%, and 85 to 90%. Stationary inner wall 103 may have a thickness in a range of 0.5 mm to 20 cm and all ranges and values there between including ranges of 0.5 mm to 1 mm, 1 mm to 2 mm, 2 mm to 3 mm, 3 mm to 4 mm, 4 mm to 5 mm, 5 mm to 6 mm, 6 mm to 7 mm, 7 mm to 8 mm, 8 mm to 9 mm, 9 mm to 1 cm, 1 to 2 cm, 2 cm to 4 cm, 4 cm to 6 cm, 6 cm to 8 cm, 8 cm to 10 cm, 10 cm to 12 cm, 12 cm to 14 cm, 14 cm to 16 cm, 16 cm to 18 cm and 18 cm to 20 cm. In embodiments of the invention, the openings are drilled straight along the thickness of stationary inner wall 103 or curved to fit various splines of stationary inner wall 103.

In embodiments of the invention, vessel 101 can be axisymmetric. In embodiments of the invention, vessel 101 may be in cylindrical shape, elliptical shape, or oval shape. According to embodiments of the invention, the cross sections of the volumes confined by the inner and outer wall may have circular, elliptical, or oval shape, or any two-dimensional shape that fits into a rectangular contour with a first and second edge length, and that has an area which is smaller than the product of the first and second edge length, and equal or larger than π/4 (=ca. 78.5%) of the product of the first and second edge length. The first and second edge length may have substantially the same value. In embodiments of the invention, the cross sections of the volumes confined by the inner and outer wall may have circular, elliptical, or oval shape, or any two-dimensional shape that fits into a rectangular contour with a first and second edge length, and that has an area which is smaller than the product of the first and second edge length. The first and second edge length may have substantially the same value.

In embodiments of the invention, vessel 101 may be made of refractory-lined steel, steel, glass-lined steel, aluminum and its alloys, other alloys and materials of construction common in chemical apparatuses, or combinations thereof. According to embodiments of the invention, outer wall 102 and stationary inner wall 103 form chamber 104, which is adapted to house a fluidized bed comprising solid particles and a fluid.

According to embodiments of the invention, fluid-solids contactor 100 comprises solids inlet 105 disposed at a first end of vessel 101. Solids inlet 105 may be adapted to receive solid particles into chamber 104. In embodiments of the invention, solids inlet 105 may be aligned with axis of vessel 101. In embodiments of the invention, the solid particles include active catalyst particles, polymer particles, spent catalyst particles, inert heat carrying particles, adsorbent particles, chemisorption particles, particles of material that needs to be oxidized, particles of material that needs to be reduced, particles that need to be combusted or gasified, particles that need to be coated, or combinations thereof. The solid particles may have an average particles size of 1 to 3000 μm and all ranges and values there between including ranges of 1 to 150 μm, 150 to 300 μm, 300 to 450 μm, 450 to 600 μm, 600 to 750 μm, 750 to 900 μm, 900 to 1050 μm, 1050 to 1200 μm, 1200 to 1350 μm, 1350 to 1500 μm, 1500 to 1650 μm, 1650 to 1800 μm, 1800 to 1950 μm, 1950 to 2100 μm, 2100 to 2250 μm, 2250 to 2400 μm, 2400 to 2550 μm, 2550 to 2700 μm, 2700 to 2850 μm, and 2850 to 3000 μm.

In embodiments of the invention, vessel 101 includes one or more feed inlets 106 disposed through outer wall 102. One or more feed inlets 106 may be aligned along the length of outer wall 102 of vessel 101. According to embodiments of the invention, feed inlets 106 are adapted to feed fluid into chamber 104 in a direction such that, as the fluid flows in chamber 104, the fluid rotates the solid particles in chamber 104. In embodiments of the invention, feed inlets 106 are adapted to feed fluid into an outer portion of chamber 104. The direction of the fluid flowing in the chamber may be at an acute angle to a longitudinal axis of vessel 101. Fluid-solids contactor 100 can include 1 to 128 feed inlets 106 at every fluid inlet axial location and all ranges and values there between including 1 to 8, 8 to 16, 16 to 24, 24 to 32, 32 to 40, 40 to 48, 48 to 56, 56 to 64, 64 to 72, 72 to 80, 80 to 88, 88 to 96, 96 to 104, 104 to 112, 112 to 120, and 120 to 128. In embodiments of the invention, vessel 101 can include 1 to 50 fluid inlet axial locations depending on the length of the reactor, which can be from 1-50 m. According to embodiments of the invention, a plurality of fluid inlets is disposed around circumference of outer wall 102 at each fluid inlet axial location. In embodiments of the invention, vessel 101 is cylindrical and feed inlets 106 are disposed in the azimuthal direction of the cylindrical vessel at a predetermined axial location. According to embodiments of the invention, each feed inlet 106 is in fluid communication with a fluid source. In embodiments of the invention, outer wall 102 is rotatable as the rotation of outer wall 102 enhances the annular rotating flow. Preferably, outer wall has structures (not shown) affixed thereto which promote contact with the solids flow.

In embodiments of the invention, the fluid may comprise a monomer, a co-monomer, co-catalyst, and/or a chain transfer agent and the solid particles may comprise a catalyst for polymerization of the monomer. Non-limiting examples for the monomer and the co-monomer may include ethylene, propylene, linear and branched $C_4$-$C_{20}$ alpha-olefins, or combinations thereof. Non-limiting examples for the chain transfer agent may include hydrogen, aluminum alkyl compounds, or combinations thereof. Non-limiting examples for the co-catalyst may include triethylaluminum. In embodiments of the invention the solid particles may comprise a mixture of a solute and a polymer, the fluid may comprise a stripping gas adapted to degas the solute from the polymer. Non-limiting examples for solute may comprise water, linear and branched $C_3$-$C_{20}$ paraffins, and combinations thereof. Non-limiting examples for stripping gas may comprise nitrogen, steam, and combinations thereof. Non-limiting examples for polymer may include linear low-density polyethylene, high-density polyethylene, ultra-high molecular weight polyethylene, isotactic polypropylene, polypropylene random and block copolymers, and ethylene-propylene diene monomer rubber. In embodiments of the invention, the fluid comprises a hydrocarbon and the solid particles comprise a catalyst for catalytically cracking the hydrocarbon. Non-limiting examples of the catalyst may include solid acids with narrow pore size distribution, solid acids with wide pore size distribution, metal-impregnated solid acids, phosphorous-impregnated solid acids, and combinations thereof. In embodiments of the invention, the solid particles may comprise a spent catalyst and the fluid may comprise a regenerating gas adapted to regenerate the spent catalyst. Non-limiting examples of the regenerating gas may include air, diluted air, oxygen, steam, and combinations thereof.

In embodiments of the invention, fluid-solids contactor 100 includes solids outlet 107 at a second end of vessel 101 adapted for removing the solid particles from vessel 101. In embodiments of the invention, solids outlet 107 is aligned in the direction of axis of vessel 101. According to embodiments of the invention, stationary inner wall 103 is adapted to stabilize the dense rotating fluidized bed and produce an annular configuration. In embodiments of the invention, stationary inner wall 103 is made of refractory-lined steel, steel, glass-lined steel, aluminum and its alloys, other alloys and materials of construction common in chemical apparatuses, or combinations thereof. In embodiments of the invention, vessel 101 is adapted to withdraw the fluid radially from chamber 104 into space confined by stationary inner wall 103. According to embodiments of the invention, withdrawal of the fluid from chamber 104 has substantially no effect on flow of solid particles of the fluidized bed. In embodiments of the invention, fluid-solids contactor 100 is cylindrical and the radial dimensions including inner and outer radii are determined to create a stable dense rotating bed. According to embodiments of the invention, the inner and outer radii of fluid-solids contactor 100 can partially determine uniformity of centrifugal force in radial direction of the cross sectional surface of fluid-solids contactor 100.

In embodiments of the invention, fluid-solids contactor 100 further comprises control valve 108 adapted to control the flow rate of the fluid discharged within stationary inner wall 103 of vessel 101. According to embodiments of the invention, fluid-solids contactor 100 further comprises flow rate control valve 109 adapted to controllably release about 1% to 99% of fluid in the space confined by wall 103 via first fluid outlet 110 and the remaining 99 to 1% of fluid in the space confined by wall 103 via second fluid outlet 111. The portion of fluid passing the flow rate control valve is set such that a limiting molar or mass fraction for one of the components of the fluid is kept constant. The limiting component may include nitrogen or carbon dioxide for catalytic cracking of hydrocarbons in the fluid-solids contactor. The limiting component may include comonomer or chain-transfer agent for polymerization in the fluid-solids contactor. The limiting component may include degassed solvent for particle drying in the fluid-solids contactor.

B. Method of Processing Materials Using Fluid-Solids Contactor

Figure 2:
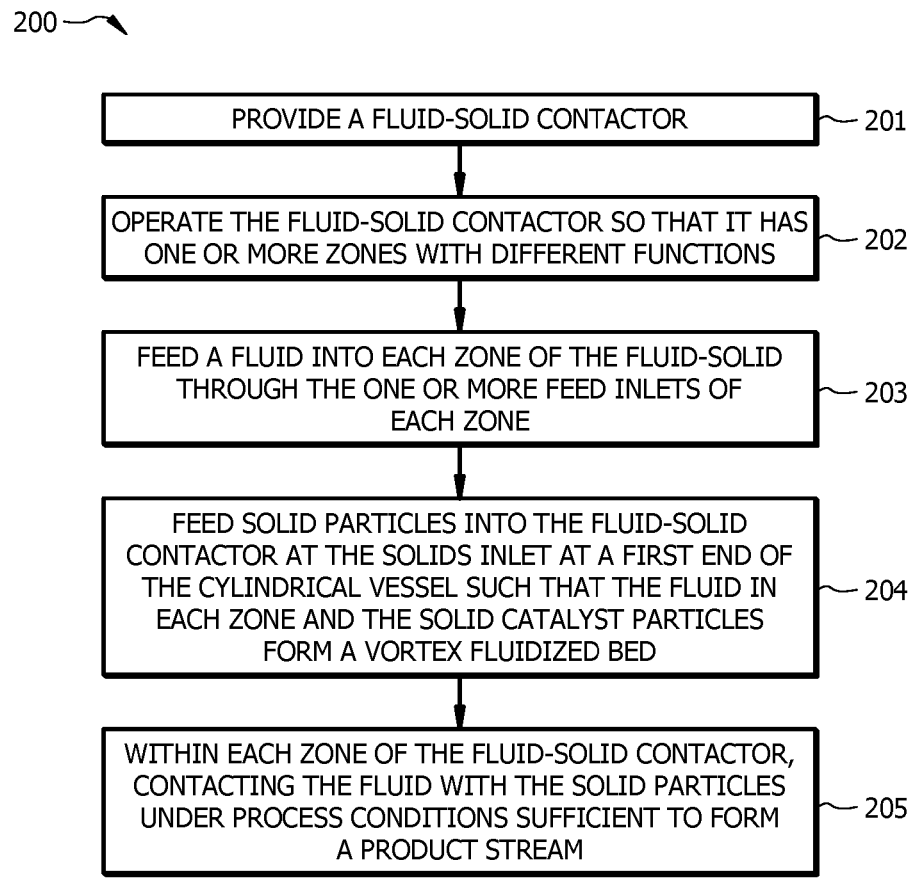
FIG. 2 shows a schematic flowchart of a method of using a fluid-solids contactor, according to embodiments of the invention.

A method of processing chemicals using a fluid-solids contactor has been discovered. The method may be capable of reducing operating costs, equipment footprint, better product quality and/or capital expenditure compared to conventional fluidized bed based fluid-solids contactors. As shown in FIG. 2, embodiments of the invention include method 200 for processing chemicals. Method 200 may be implemented by fluid-solids contactor 100, as shown in FIG. 1. In method 200, fluid-solids contactor 100 can be used as a catalytic cracker, a polymer degasser, a polymerization reactor, and/or a catalyst regeneration unit. According to embodiments of the invention, as shown in block 201, method 200 may include providing fluid-solids contactor 100. In embodiments of the invention, fluid-solids contactor 100 can be placed in any direction including horizontal, vertical, or titled at an angle.

According to embodiments of the invention, as shown in block 202, method 200 includes operating vessel 101 so that it has one or more zones with different functions, each of which comprises one or more of feed inlets 106. In embodiments of the invention, each zone comprises 1 to 102 feed inlets 106 and all ranges and values there between.

In embodiments of the invention, as shown in block 203, method 200 includes feeding a fluid into each zone of fluid-solids contactor 100 through one or more feed inlets 106 of each zone. In embodiments of the invention, feed inlets 106 in each zone include one or more adjacent feed inlets 106. According to embodiments of the invention, the fluids fed into the one or more zones are different. According to embodiments of the invention, as shown in block 204, method 200 includes feeding solid particles into fluid-solids contactor 100 at solids inlet 105 at a first end of vessel 101 such that the fluid fed in (each zone of) vessel 101 and the solid catalyst particles form an annular rotating fluidized bed. In embodiments of the invention, the fluid fed in vessel 101 is injected at a speed and angle such that rotational speed of the fluid and the solid particles in the annular rotating fluidized bed is in a range sufficient to substantially prevent the solid particles from attaching to inner surface of outer wall 102, and to substantially prevent the solid particles from attaching to outer surface of stationary inner wall 103.

According to embodiments of the invention, fluid-solids contactor 100 is placed vertically and the solid particles flow in a spiral trajectory. The net flow rate of the solids in the axial direction (or the pitch of the spiral trajectory of the particles) in vertically placed fluid-solids contactor 100 may be adjusted by the ratio of centrifugal force to axial gravity force, the rates of solids entering through solids inlet 105 and leaving through solids outlet 106 and/or by adjusting elevation angle of the fluid when it is injected to chamber 104 to increase or decrease axial flow rate of the solid particles. In embodiments of the invention, fluid-solids contactor 100 can be placed horizontally and the solid particles flow in a spiral trajectory. The net flow rate of the solids in the axial direction (or the pitch of the spiral trajectory of the particles) in horizontally placed fluid-solids contactor 100 may be adjusted by pressure drop, the rates of solids entering through solids inlet 105 and leaving through solids outlet 106 and/or elevation angle of a direction that fluid flows in chamber 104. In embodiments of the invention, average loading of the solid particles in vessel 101 is in a range of 50 to 1500 kg/m$^3$ and all ranges and values there between including ranges of 50 to 100 kg/m$^3$, 100 to 200 kg/m$^3$, 200 to 300 kg/m$^3$, 300 to 400 kg/m$^3$, 400 to 500 kg/m$^3$, 500 to 600 kg/m$^3$, 600 to 700 kg/m$^3$, 700 to 800 kg/m$^3$, 800 to 900 kg/m$^3$, 900 to 1000 kg/m$^3$, 1000 to 1100 kg/m$^3$, 1100 to 1200 kg/m$^3$, 1200 to 1300 kg/m$^3$, 1300 to 1400 kg/m$^3$, and 1400 to 1500 kg/m$^3$. In embodiments of the invention, the average loading of the solid particles in vessel 101 is a ratio of solids mass contained in chamber 104 to the total volume of chamber 104. According to embodiments of the invention, the rotational speed of the fluid and the solid particles in each zone of the annular rotating fluidized bed is sufficient to maintain a substantially uniform annular solids flow. In embodiments of the invention, the attrition of the solid particles is mitigated through fluid injection, which provides gas cushioning at the inner surface of outer wall 102 to reduce particle-wall collisions.

According to embodiments of the invention, method 200 includes within each zone of the fluid-solids contactor, contacting the fluid with the solid particles under process conditions sufficient to form a product, as shown in block 205. In embodiments of the invention, the fluid fed in one or more of the zones includes one or more hydrocarbons, the solid particles include a catalyst for catalytically cracking the hydrocarbons, and the conditions in the contacting step are sufficient to catalytically crack the hydrocarbons. Non-limiting examples for the hydrocarbons may include crude oil, naphtha, vacuum gas oil, natural gas condensates, and combinations thereof. The catalyst for catalytically cracking the hydrocarbons can include solid acids with narrow pore size distribution, solid acids with wide pore size distribution, metal-impregnated solid acids, phosphorous-impregnated solid acids, or combinations thereof. The process conditions at block 205 can include a catalytic cracking temperature in a range of 400 to 800° C. and all ranges and values there between including 400 to 420° C., 420 to 440° C., 440 to 460° C., 460 to 480° C., 480 to 500° C., 500 to 520° C., 520 to 540° C., 540 to 560° C., 560 to 580° C., 580 to 600° C., 600 to 620° C., 620 to 640° C., 640 to 660° C., 660 to 680° C., 680 to 700° C., 700 to 720° C., 720 to 740° C., 740 to 760° C., 760 to 780° C., and 780 to 800° C. The process conditions at block 205 can include a catalytic cracking pressure of 0.1 to 10 bar and all ranges and values there between including ranges of 0.1 to 0.2 bar, 0.2 to 0.3 bar, 0.3 to 0.4 bar, 0.4 to 0.5 bar, 0.5 to 0.6 bar, 0.6 to 0.7 bar, 0.7 to 0.8 bar, 0.8 to 0.9 bar, 0.9 to 1 bar, 1 to 2 bar, 2 to 3 bar, 3 to 4 bar, 4 to 5 bar, 5 to 6 bar, 6 to 7 bar, 7 to 8 bar, 8 to 9 bar, and 9 to 10 bar. The process conditions at block 205 can include a residence time for catalyst for catalytic cracking in a range of 1 to 3600 s and all ranges and values there between including 1 to 200 s, 200 to 400 s, 400 to 600 s, 600 to 800 s, 800 to 1000 s, 100 to 1200 s, 1200 to 1400 s, 1400 to 1600 s, 1600 to 1800 s, 1800 to 2000 s, 2000 to 2200 s, 2200 to 2400 s, 2400 to 2600 s, 2600 to 2800 s, 2800 to 3000 s, 3000 to 3200 s, 3200 to 3400 s, and 3400 to 3600 s. The process conditions at block 205 can include a residence time for fluid for catalytic cracking in a range of 0.01 and 10 s and all ranges and values there between including ranges of 0.01 to 0.1 s, 0.1 to 0.2 s, 0.2 to 0.3 s, 0.3 to 0.4 s, 0.4 to 0.5 s, 0.5 to 0.6 s, 0.6 to 0.7 s, 0.7 to 0.8 s, 0.8 to 0.9 s, 0.9 to 1 s, 1 to 2 s, 2 to 3 s, 3 to 4 s, 4 to 5 s, 5 to 6 s, 6 to 7 s, 7 to 8 s, 8 to 9 s, and 9 to 10 s.

In embodiments of the invention, the fluid fed in one or more of the zones includes a regenerating gas, the solid particles include a spent catalyst, and the process conditions at block 205 are regenerating conditions sufficient to regenerate the spent catalyst. The regenerating conditions can include a regenerating temperature of 400 to 1000° C. and all ranges and values there between including ranges of 400 to 450° C., 450 to 500° C., 500 to 550° C., 550 to 600° C., 600 to 650° C., 650 to 700° C., 700 to 750° C., 750 to 800° C., 800 to 850° C., 850 to 900° C., 900 to 950° C., and 950 to 1000° C. The regenerating conditions at block 205 can include a regenerating pressure of 0.1 to 10 bar and all ranges and values there between including ranges of 0.1 to 0.2 bar, 0.2 to 0.3 bar, 0.3 to 0.4 bar, 0.4 to 0.5 bar, 0.5 to 0.6 bar, 0.6 to 0.7 bar, 0.7 to 0.8 bar, 0.8 to 0.9 bar, 0.9 to 1 bar, 1 to 2 bar, 2 to 3 bar, 3 to 4 bar, 4 to 5 bar, 5 to 6 bar, 6 to 7 bar, 7 to 8 bar, 8 to 9 bar, and 9 to 10 bar. The regenerating conditions at block 205 can include a residence time of 0.01 to 100 s and all ranges and values there between. According to embodiments of the invention, the regenerated catalyst is flowed back to one or more of the zones through the solids inlet.

In embodiments of the invention, the fluid fed in one or more of the zones includes one or more monomers and/or chain transfer agent, the solid particles include a catalyst for catalyzing polymerization of the monomer(s) embedded in nascent polymer, and the process conditions at block 205 include reaction conditions sufficient to polymerize the monomer(s) to form a polymer. The reaction conditions can include a polymerization temperature of 20 to 200° C. and all ranges and values there between including ranges of 20 to 40° C., 40 to 60° C., 60 to 80° C., 80 to 100° C., 100 to 120° C., 120 to 140° C., 140 to 160° C., 160 to 180° C., and 180 to 200° C. The reaction conditions can include a polymerization pressure of 2 to 60 bar and all ranges and values there between. The reaction conditions can include a residence time of polymerizing particle of 60 to 7200 s and all ranges and values there between including ranges of 60 to 600 s, 600 to 1200 s, 1200 to 1800 s, 1800 to 2400 s, 2400 to 3000 s, 3000 to 3600 s, 3600 to 4200 s, 4200 to 4800 s, 4800 to 5400 s, 5400 to 6000 s, 6000 to 6600 s, and 6600 to 7200 s.

In embodiments of the invention, the fluid fed in one or more of the zones includes a stripping gas, the solid particles include a mixture of a solute and a polymer, and the processing conditions at block 205 include degassing conditions sufficient to substantially degas the solute from the polymer to form dry solid polymer. The degassing conditions at block 205 can include a temperature of 20 to 200° C. and all ranges and values there between including ranges of 20 to 40° C., 40 to 60° C., 60 to 80° C., 80 to 100° C., 100 to 120° C., 120 to 140° C., 140 to 160° C., 160 to 180° C., and 180 to 200° C. The degassing conditions can include a pressure of 0.1 to 10 bar and all ranges and values there between including ranges of 0.1 to 0.2 bar, 0.2 to 0.3 bar, 0.3 to 0.4 bar, 0.4 to 0.5 bar, 0.5 to 0.6 bar, 0.6 to 0.7 bar, 0.7 to 0.8 bar, 0.8 to 0.9 bar, 0.9 to 1 bar, 1 to 2 bar, 2 to 3 bar, 3 to 4 bar, 4 to 5 bar, 5 to 6 bar, 6 to 7 bar, 7 to 8 bar, 8 to 9 bar, and 9 to 10 bar. The degassing conditions can include a residence time of the solid particles of 300 to 7200 s and all ranges and values there between including ranges of 300 to 600 s, 600 to 1200 s, 1200 to 1800 s, 1800 to 2400 s, 2400 to 3000 s, 3000 to 3600 s, 3600 to 4200 s, 4200 to 4800 s, 4800 to 5400 s, 5400 to 6000 s, 6000 to 6600 s, and 6600 to 7200 s.

In embodiments of the invention, the fluid fed in one or more of the zones includes a purge gas adapted to purge the one or more of the zones. The purge gas may include nitrogen, argon, steam, hydrogen, methane, ethane, propane, or combinations thereof. According to embodiments of the invention, in method 200, fluid-solids contactor 100 can include one or more zones for catalytic cracking hydrocarbons and regenerating the catalyst, one or more zones for catalytically polymerizing monomer(s), one or more zones for purging the interstitial gas with the composition of the zone from which the solid particles exit, and/or one or more zones for degassing polymer solids. In any of the zones, the fluid may be introduced through a plurality of inlets in the axial direction in vessel 101.

Although embodiments of the present invention have been described with reference to blocks of FIG. 2, it should be appreciated that operation of the present invention is not limited to the particular blocks and/or the particular order of the blocks illustrated in FIG. 2. Accordingly, embodiments of the invention may provide functionality as described herein using various blocks in a sequence different than that of FIG. 2.

As part of the disclosure of the present invention, specific examples are included below. The examples are for illustrative purposes only and are not intended to limit the invention. Those of ordinary skill in the art will readily recognize parameters that can be changed or modified to yield essentially the same results.

EXAMPLE 1

Annular Rotating Fluidized Bed for Fluid Catalytic Cracking

Figure 3:
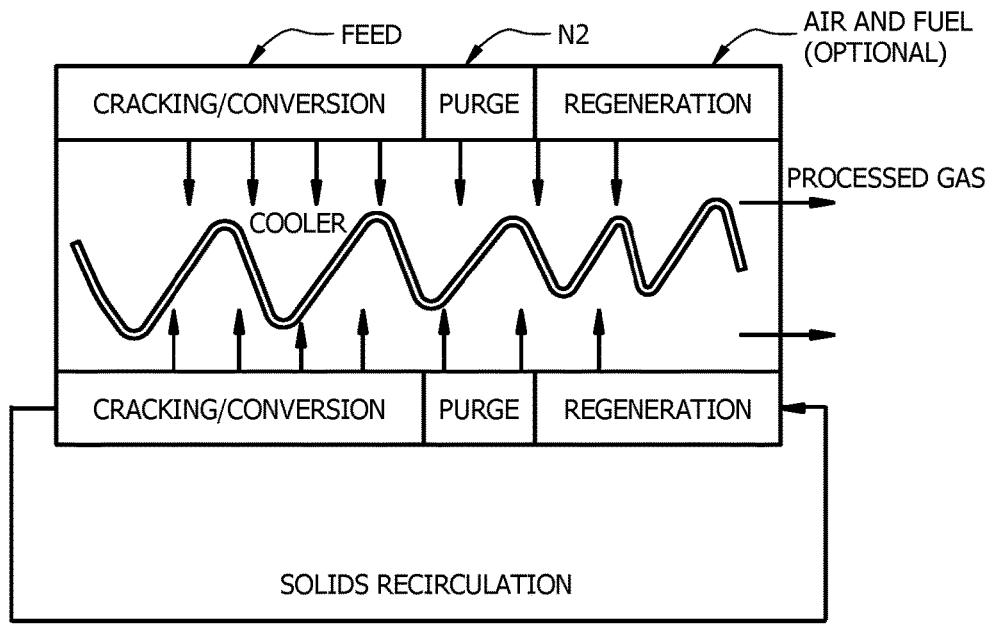
FIG. 3 shows a schematic diagram of a fluid-solids contactor used as a fluid catalytic cracker, according to embodiments of the invention.

The schematic diagram for the fluid-solids contactor containing an annular rotating fluidized bed is shown in FIG. 3. The fluid-solids contactor can be used for cracking petroleum fractions. The catalyst particles are introduced into the chamber between the stationary inner wall and the outer wall at the top of the contactor. The fluid-solids contactor comprises three zones including a cracking zone, a purge zone, and a regeneration zone. The hydrocarbon feed stream, optionally diluted by steam, is fed into the cracking zone and is catalytically cracked in the presence of the catalyst particles to produce a product stream including light olefins, $C_6$-$C_8$ aromatics, and coke formed on the surface of the catalyst. The spent catalyst particles are flowed from the cracking zone to the purge zone, which is purged using a purge gas. The purge gas can include nitrogen, steam, fuel gas, or combinations thereof. When both nitrogen and fuel gas are used as the purge gas, the nitrogen and the fuel gas are not mixed before the purge gas is fed into the purge zone. The catalyst particles are then further flowed to the regeneration zone after purging of the interstitial gas. The purged catalyst particles in the regeneration zone are regenerated in the regeneration zone using air via combustion. The regenerated catalyst is then flowed back to the cracking zone. In the vertical fluid-solids contactor, the solid catalyst flows downward in a spiral trajectory from the cracking zone to the regeneration zone. The combustion products from the regeneration zone and a portion of the steam from the purge zone can be routed to the space within the stationary inner wall of fluid-solids contactor, and leave the space within the stationary inner wall of fluid-solids contactor towards the end closer to the regeneration zone. The effluent from the contactor comprising the products and the unreacted feed is routed to the space within the stationary inner wall of fluid-solids contactor, and leave the space within the stationary inner wall of fluid-solids contactor towards the end closer to the cracking zone. The effluent radially withdrawn from the cracking zone into the space confined by the stationary inner walls can be cooled by means of a cooling device located inside the space confined by the stationary inner walls. The cooling device can be tubes, or coils, or plates through which a cooling agent flows and the heat can be recovered as in conventional heat exchangers for utilities and other purposes. The cooling agent can be cooling water, thermal oil, boiling water, saturated steam, or air. The unreacted feed can be separated from the products and recycled to the cracking zone. Overall, the fluid-solids contactor containing the annular rotating fluidized bed can improve heat transfer rates, reduce the contact time between the fluid and the solid catalyst, and improve the uniformity of the residence time for the solid catalyst in each zone, compared to conventional fluid catalytic cracker.

EXAMPLE 2

Annular Rotating Fluidized Bed for Gas-Phase Polymerization

Figure 4:
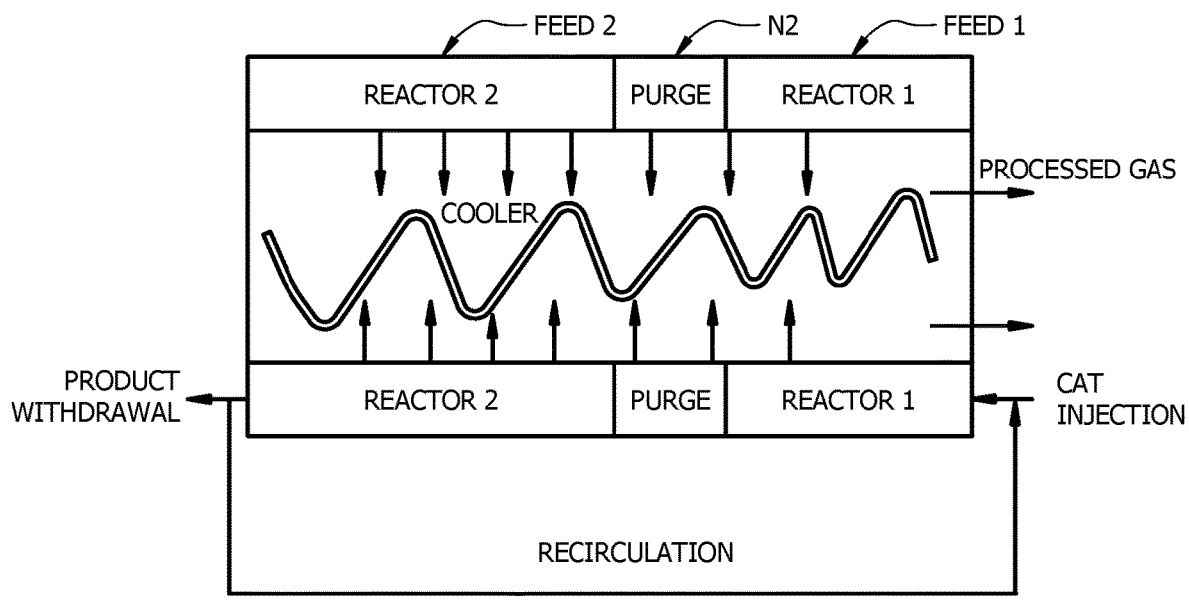
FIG. 4 shows a schematic diagram of a fluid-solids contactor used as two polymerization reactors, according to embodiments of the invention.

The schematic diagram for the fluid-solids contactor containing an annular rotating fluidized bed is shown in FIG. 4. The fluid-solids contactor can be used as a polymerization reactor for gas monomers. The fluid-solids contactor comprises a first polymerization zone, a purge zone, and a polymerization reaction zone. Polymerization catalyst particles are fed into the chamber of the contactor to the inlet of the first polymerization zone. The polymerization catalyst particles move along the axis of the fluid solids contactor in a spiral trajectory, and are embedded inside the growing polymer particles. The polymerization catalyst can be injected as dry powder, as slurry of catalyst particles in mineral oil, or as catalyst already embedded inside some polymer formed in a prepolymerization reactor upstream of the fluid-solids contactor. Monomer feed comprising a first monomer, optionally a chain-transfer agent, optionally a second monomer, optionally a third monomer, and optionally a $C_2$-$C_8$ paraffin is flowed into the first polymerization zone to contact the polymerization catalyst and form solid polymers. The polymerization catalyst and the solid polymer flow from the first polymerization zone to the purge zone, where purge gas is used to purge the gas with a composition prevailing in the first polymerization zone from the polymer particles. The purge gas can be nitrogen, argon, methane, a $C_2$-$C_8$ paraffin, the first monomer and optionally a mixture of the first monomer with chain transfer agent and the second or third monomer. The polymerization catalyst flows from the purge zone to the second polymerization zone. A second feed comprising the first monomer, optionally the second monomer, optionally a third monomer, optionally a chain transfer agent, and optionally a $C_2$-$C_8$ paraffin is flowed into the second polymerization zone to contact the polymerization catalyst and form different polymer from the polymer produced in the first polymerization zone. The components forming the second feed can be the same as those forming the first feed, but in different molar or mass ratios of chain transfer agent to first monomer, second monomer to first monomer, and third monomer to first monomer. By using this fluid-solids contactor, polymers of small particle sizes, such as high density polyethylene with a monomodal or bimodal molecular weight distribution (HDPE) and ultra-high molecular weight polyethylene (UHMWPE), can be produced without diluent, resulting in lower separation cost and lower residual volatiles in the final product. Chain transfer agent, first monomer, and second and third monomer can be fed through a plurality of inlets along the axial direction of the fluid-solids contactor to control the ratios of chain transfer agent to first monomer, second monomer to first monomer, and third monomer to first monomer. The fluid-solids contactor can also produce polymer particles with narrow particle size distribution compared to conventional fluidized bed reactors as all the particles will have substantially the same residence time in each reaction zone. In embodiments of the present invention a fraction of the solid particles are recirculated from the outlet to the inlet (see FIG. 4).

In the context of the present invention, at least the following 25 embodiments are described. Embodiment 1 is a fluid-solids contactor adapted to form an annular rotating fluidized bed. The fluid-solids contactor includes a vessel comprising an outer wall and a stationary inner wall forming a chamber. The fluid-solids contactor also includes a solids inlet, at a first end of the vessel, adapted to receive solid particles into the chamber. The fluid-solids contactor further includes one or more feed inlets adapted to inject a fluid into the chamber in a direction such that as the fluid flows in the chamber, the solid particles create an annular rotating bed, wherein the stationary inner wall of the vessel is permeable to the fluid such that the vessel is configured to withdraw the fluid radially into space confined by the stationary inner wall. Embodiment 2 is the fluid-solids contactor of embodiment 1, wherein the one or more feed inlets and the solid inlet are adapted to inject feed gas and solid particles in a direction that is at an acute angle to a longitudinal axis of the vessel. Embodiment 3 is the fluid-solids contactor of either of embodiments 1 or 2, further including an outlet at a second end of the vessel adapted to remove the solid particles from the vessel. Embodiment 4 is the fluid-solids contactor of any of embodiments 1 to 3, wherein the fluid-solids contactor is adapted to be operated such that the longitudinal axis is one of: horizontal, vertical, or inclined at an angle. Embodiment 5 is the fluid-solids contact of any of embodiments 1 to 4, wherein the solids inlet is oriented in an axial direction or a radial direction of the vessel. Embodiment 6 is the fluid-solids contactor of any of embodiments 1 to 5, wherein the solid inlet at the first end of the vessel is adapted to receive solid particles having a particle size distribution of 1 to 3000 microns. Embodiment 7 is the fluid-solids contactor of any of embodiments 1 to 6, wherein the fluid-solids contactor includes one or more inlets along the longitudinal axis of the vessel at different axial locations, each individually in fluid communication with a fluid source. Embodiment 8 is the fluid-solids contactor of any of embodiments 1 to 7, wherein the fluid-solids contactor contains 1 to 128 inlets disposed in the azimuthal direction of the vessel with a vessel length of 1 to 50 m at a pre-determined axial location in fluid communication with a fluid source. Embodiment 9 is the fluid-solids contactor of any of embodiments 1 to 8 further including a cyclone to separate the gas and solid particles. Embodiment 10 is the fluid fluid-solids contactor of any of embodiments 1 to 8 wherein the reactor is a one pass reactor or a circulating reactor.

Embodiment 11 is a method of processing materials. The method includes providing a fluid-solids contactor that contains a vessel comprising an outer wall and a stationary inner wall forming a chamber, a solids inlet, at a first end of the vessel, adapted to receive solid particles into the chamber, and one or more feed inlets adapted to inject a fluid into the chamber in a direction such that as the fluid flows in the chamber, the solid particles create an annular rotating bed, wherein the stationary inner wall of the vessel is permeable to the fluid such that the vessel is configured to withdraw the fluid radially into space within the stationary inner wall. The method further includes operating the fluid-solids contactor so that it has at least two zones with different functions, wherein each zone comprises one or more of the feed inlets. In addition, the method includes feeding a fluid into each zone of the fluid-solids contactor through the one or more feed inlets of each zone, and feeding solid particles into the fluid-solids contactor at the solids inlet at a first end of the vessel such that the fluid in each zone and the solid particles form an annular rotating fluidized bed. The method further includes, within each zone of the fluid-solids contactor, contacting the fluid with the solid particles under process conditions sufficient to form a product, wherein the at least two zones include at least one purge zone adapted to purge the interstitial gas from the solid particles therein with a purge gas. Embodiment 12 is the method of embodiment 11 wherein the purge gas includes nitrogen gas, carbon dioxide, argon, steam hydrogen, methane, $C_2$-$C_8$ paraffin, or combinations thereof. Embodiment 13 is the method of either of embodiments 11 or 12, wherein the fluid in one or more of the zones includes one or more hydrocarbons, the solid particles include a catalyst for catalytically cracking the hydrocarbons, and the conditions in the contacting step are sufficient to catalytically crack the hydrocarbons. Embodiment 14 is the method of any of embodiments 11 to 13, wherein the fluid in one or more of the zones includes a regenerating gas, the solid particles include a spent catalyst, and the conditions in the contacting step are sufficient to regenerate the spent catalyst to form regenerated catalyst. Embodiment 15 is the method of any of embodiments 11 to 14, wherein the fluid in one or more of the zones includes one or more monomers, the solid particles include a catalyst for catalyzing polymerization of the monomers, and the process conditions in the contacting step are sufficient to cause the polymerization of the monomers. Embodiment 16 is the method of any of embodiments 11 to 15, wherein the fluid fed in one or more of the zones includes a stripping gas, the solid particles include a mixture of a solute and a polymer, and the processing conditions in the contacting step are sufficient to degas the solute from the polymer to form dry solid polymer. Embodiment 17 is the method of any of embodiments 11 to 16, further including withdrawing the fluid into the space confined by the stationary inner wall to separate the fluid from the solid particles, wherein the solid particles are kept in the chamber by centrifugal force. The method further includes removing the solid particles from an outlet at a second end of the cylindrical vessel with controlled solid rotation and discharge rate. Embodiment 18 is the method of any of embodiments 11 to 17, wherein rotational speed of the solid particles in each zone of the apparatus is in a range sufficient to maintain a uniform annular solid flow. Embodiment 19 is the method of any of embodiments 11 to 18, wherein attrition of the solid particles is mitigated through fluid injection, which provides gas cushioning at inner surface of the outer wall to reduce particle-wall collisions. Embodiment 20 is the method of any of embodiments 11 to 19, wherein the fluid fed into one or more zones includes a purge gas adapted to purge the interstitial gas from the solid particles in the one or more zones. Embodiment 21 is the method of embodiment 17, further including the step of recirculating a fraction of the solid particles from the outlet to the inlet. Embodiment 22 is the method of any of embodiments 11 to 21, further comprising rotating the outer wall to enhance the annular rotating flow. Embodiment 23 is the method of embodiment 22, wherein the outer wall is structures affixed thereto that promote contact with the solids flow. Embodiment 24 is the method of embodiments 11 to 23, wherein particles are separated from the gas with a cyclone. Embodiment 25 is the fluid-solids contactor of any of embodiments 1 to 7, wherein the outer wall is rotatable.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A fluid-solids contactor adapted to form an annular rotating fluidized bed, the fluid-solids contactor comprising:
   a vessel comprising an outer wall and a stationary inner wall forming a chamber;
   a solids inlet positioned at a first end of the vessel, wherein the solids inlet is adapted to receive solid particles into the chamber; and
   one or more feed inlets adapted to inject a fluid into the chamber in a direction such that, as the fluid flows in the chamber, the solid particles create an annular rotating bed;
   wherein the stationary inner wall of the vessel is permeable to the fluid such that the vessel is configured to withdraw the fluid into space within the stationary inner wall; and
   wherein the outer wall is rotatable.

2. The fluid-solids contactor of claim 1, wherein the stationary inner wall of the vessel is permeable to the fluid such that the vessel is configured to withdraw the fluid radially into space within the stationary inner wall.

3. The fluid-solids contactor of claim 1, wherein the one or more feed inlets are adapted to inject the fluid in a direction that is at an acute angle to a longitudinal axis of the vessel.

4. The fluid-solids contactor of claim 1, wherein the solid particles comprise (i) active catalyst particles, (ii) polymer particles, (iii) spent catalyst particles, (iv) inert heat carrying particles, (v) adsorbent particles, (vi) chemisorption particles, (vii) particles of material that needs to be oxidized, particles of material that needs to be reduced, (viii) particles that need to be combusted or gasified, (ix) particles that need to be coated, or fix) (x) combinations thereof.

5. The fluid-solids contactor of claim 1, wherein the solids inlet is adapted to inject the solid particles in a direction that is at an acute angle to a longitudinal axis of the vessel.

6. The fluid-solids contactor of claim 1, further comprising:
   an outlet at a second end of the vessel adapted to remove the solid particles from the vessel.

7. The fluid-solids contactor of claim 1, wherein the fluid-solids contactor is adapted to be operated such that the longitudinal axis is one of: horizontal, vertical, or inclined at an angle.

8. The fluid-solids contactor of claim 1, wherein the solids inlet is oriented in an axial direction or a radial direction of the vessel.

9. The fluid-solids contactor of claim 1, wherein the solid inlet at the first end of the vessel is adapted to receive solid particles having a particle size distribution of 1 to 3000 microns.

10. The fluid-solids contactor of claim 1, wherein the one or more feed inlets are located along the longitudinal axis of the vessel at different axial locations, each individually in fluid communication with a fluid source.

11. The fluid-solids contactor of claim 1, wherein the vessel is made of material comprising refractory-lined steel, steel, glass-lined steel, aluminum, or a combination thereof.

12. The fluid-solids contactor of claim 1, wherein the vessel is cylindrical and the one or more feed inlets are disposed in an azimuthal direction of the vessel.

13. The fluid-solids contactor of claim 1, wherein the fluid comprises one or more of a monomer, a co-monomer, co-catalyst, and a chain transfer agent and wherein the solid particles comprise a catalyst for polymerization of the monomer.

14. The fluid-solids contactor of claim 13, wherein the monomer comprises ethylene, propylene, one or more linear or branched $C_4$-$C_{20}$ alpha-olefins, or a combination thereof.

15. The fluid-solids contactor of claim 13, wherein the chain transfer agent comprises hydrogen, aluminum alkyl compounds, or a combination thereof.

16. The fluid-solids contactor of claim 13, wherein the co-catalyst comprises triethylaluminum.

17. The fluid-solids contactor of claim 1, wherein the fluid-solids contactor comprises a fluid catalytic cracker.

18. The fluid-solids contactor of claim 1, wherein the fluid-solids contactor comprises a polymer degasser.

19. The fluid-solids contactor of claim 1, wherein the fluid-solids contactor comprises a polymerization reactor.

20. The fluid-solids contactor of claim 1, wherein the fluid-solids contactor comprises a catalyst regeneration unit.

* * * * *

UNITED STATES PATENT AND TRADEMARK OFFICE
CERTIFICATE OF CORRECTION

PATENT NO. : 12,145,144 B2
APPLICATION NO. : 17/310585
DATED : November 19, 2024
INVENTOR(S) : Sreekanth Pannala et al.

Page 1 of 1

It is certified that error appears in the above-identified patent and that said Letters Patent is hereby corrected as shown below:

In the Claims

In Claim 4, Column 16, Line 2, please delete "fix)" after --or--.

Signed and Sealed this
Twenty-fifth Day of February, 2025

Coke Morgan Stewart
*Acting Director of the United States Patent and Trademark Office*